United States Patent Office 3,041,287
Patented June 26, 1962

3,041,287
**HEAVY METAL LOADED PLASTIC SCINTIL-
LATING COMPOSITIONS**
Mark Hyman, Jr., Belmont, Mass., assignor to the United
States of America as represented by the United States
Atomic Energy Commission
No Drawing. Filed Jan. 27, 1959, Ser. No. 789,455
2 Claims. (Cl. 252—301.2)

The present invention relates to new plastic scintillating compositions for use in detecting energetic radiation such as X-rays and gamma rays. More particularly, it relates to haze-free, color-free and transparent scintillating compositions in which incident X-rays and gamma rays interact with the composition through a photo-electric process in a significant fraction of the interactions.

The use of plastic scintillating compositions coupled to a photo-multiplier tube for detection of ionizing radiation is well known. The basis of a scintillation detection system is the use of a scintillation composition to convert to visible or ultra-violet light at least a part of the energy during the passage of an ionizing radiation through it. This light impinges on the photo-cathode of the photo-multiplier tube and is converted into an electrical pulse. This electrical pulse may, in certain instances, be sufficient to activate a scaler or rate meter, and in other instances may require further amplification. Details concerning the use of scintillators in general and plastic scintillators in particular, are described in a number of publications. See, for example, the book "Luminescence and the Scintillation Counter" by Curran, Buttersworth Scientific Publications, 1953.

Plastic scintillating compositions can respond to incident X-rays and gamma rays by the Compton effect and the photo-electric effect. In the Compton effect, an incident X- or gamma ray photon interacts with an atomic electron of the scintillating composition. The X- or gamma ray is scattered and some of its energy is transferred to the electron. The energy of the electron varies with the angle between the paths of the incident X- or gamma ray and the scattered gamma ray. When the energetic electron passes through the scintillating composition, a light flash occurs. The light, in turn, activates the photo-multiplier to produce a voltage pulse at the output thereof. The pulse magnitude is not a direct function of the energy of the photons (gamma or X-rays) incident on the scintillating composition; it may actually be the same for different energies of incident X- or gamma radiation. The net result is that there is little or no resolution of the energies of the incident radiation possible when the Compton process is relied on in the scintillator.

In the photo-electric process, the X or gamma ray photon is absorbed by an atom of the scintillating composition. One of the atomic electrons, usually from an inner shell, is then ejected by the atom. This electron has a kinetic energy equal to that of the absorbed photon minus the binding energy of the electron. This binding energy is then given off by the atom as an X-ray or Auger electron when the vacancy in the inner shell is filled. Both the photoelectron and the X-rays and Auger electrons have quite short ranges in the scintillator. The result of this process is therefore that in most cases the entire energy of the incident photon is absorbed in the crystal. This means that the intensity of the light pulse from the scintillator is proportional to the energy of the absorbed X or gamma ray in this case.

In previous plastic scintillation compositions, the light produced has been mostly by means of the Compton process. Only a relatively small percentage of the incident energetic photons reacted with the plastic scintillator by the photoelectric process.

The magnitude of the photoelectric effect is proportional to the density of the scintillating composition and to the atomic number of its constituent elements. Known plastic scintillating compositions are of low density, generally of the order of 1 to 1.2 grams per cubic centimeter. Also, their constitutent atoms are elements of low atomic number (hydrogen and carbon) so that the interaction by means of a photoelectric effect is of low magnitude. Because of this, plastic scintillating compositions known heretofore do not provide electrical pulses which are sufficiently defined to permit efficient resolution of energies of incident X- and gamma-radiation.

It is, therefore, an object of the present invention to provide a haze-free, transparent and substantially color-free plastic scintillating composition capable of resolving incident X- and gamma-radiation with relatively high efficiency. It is another object of the present invention to provide a plastic scintillating composition having the above properties in which the reaction of the composition with incident radiation results in a total absorption of the X- or gamma ray energy in a significant fraction of the interactions. A still further object of the present invention is to provide a plastic scintillating composition having the above properties by virtue of containing an element of high atomic number.

The usual plastic scintillator consists of at least one phosphor dissolved in a solid base plastic. The solvent base plastic generally consists of a material such as polystyrene or polyvinyl toluene. Other plastics containing conjugated bonds and/or an aromatic ring have also been used. These include, among others, polyvinyl naphthalene, polyisopropyl styrene and copolymers of the monomers represented in the polymers listed above. Two types of phosphors are generally incorporated in the base plastic, a phosphor which may be termed the "primary solute" and another phosphor which may be termed the "spectrum shifter."

It is generally acepted that the energy of the incident radiation is absorbed by the solvent plastic, and this absorption is followed by a transfer of energy to the primary solute and thence to the spectrum shifting phosphor which fluoresces to give light in the visible or ultraviolet region of the spectrum. Certain solvent plastics may also fluoresce to produce light. Any additive which interferes with this sequence of energy transfer will quench, at least to some extent, the light output.

Previous attempts to include a metal of high atomic number in plastic scintillating compositions in order to increase the probability of photo-electric interactions with incident radiation have been largely unsuccessful. Heavy metals are generally not soluble in such compositions to any appreciable extent. Moreover, heavy metals that have been successfully solubilized in these compositions have been found to quench the light output.

In accordance with my invention, I incorporate a material of high atomic number in a solvent base plastic and still produce a transparent, haze-free plastic composition which is particularly useful in resolving the energy spectra of incident X- and gamma-radiation.

Briefly, my invention comprises a solid solution of a plastic containing dissolved therein at least one organic phosphor and a lead compound having the following general formula:

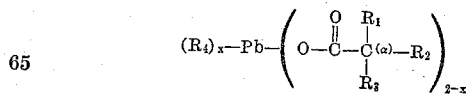

Where $R_1$, $R_2$ and $R_3$ are selected from the group consisting of hydrogen and alkyl and phenyl radicals, $R_4$ is selected from the group consisting of acrylyl and methacrylyl radicals and $x$ is a number from 0 to 1, said phosphor and said compound being dissolved in a polymeric plastic selected from the group consisting of polyvinyl toluene and copolymers of vinyl toluene and an acrylic monomer. In general, the solubility of the lead compound in the solvent plastic is increased when the alkyl radicals joined to the alpha carbon atom (identified in the general formula) are branched.

The phosphor to be included in the scintillating composition may be chosen from a large number of compounds. The amount of phosphor to be incorporated can vary from less than 1% to about 5% by weight of the compostion. No advantage is gained generally, in terms of light output, by using greater amounts of phophor. Examples of primary solute phosphors which may be used include the following: terphenyl, p-terphenyl, phenylbiphenylyloxadiazole-1,3,4, and diphenyloxadiazole-1,3,4.

The second phosphor or "wave shifter" may be chosen, among others, from the following: p-bis [2-(5-phenyloxazolyl)]-benzene, p-bis [2-(5-p-biphenylyloxazolyl)]-benzene, 1,1,4,4-tetraphenylbutadiene, p,p¹-diphenylstilbene, 2-(1 naphthyl)-5 phenyl oxazole, p-quaterphenyl, 9,10-diphenylanthracene, 2,5-dibiphenylyloxazole.

In some cases, it has been found sufficient to use only a primary phosphor in converting the incident radiation to a useful light output. However, for most practical purposes, at least one primary and at least one secondary or wavelength-shifting phosphor should be included to produce useful pulse heights.

The solvent base plastic is produced from monomers which, on polymerization, produce a transparent plastic in which the selected lead salts are soluble. Polymers of vinyl toluene and copolymers of vinyl toluene with cyclohexyl methacrylate have been found to be most effective as the solvent plastic. As much as 50% cyclohexyl methacrylate by weight of total monomer reactants may be copolymerized with vinyl toluene to produce a useful solvent plastic for the selected lead salt. Other polymerizable vinyl aromatic monomers and copolymers of vinyl aromatic monomers with acrylate and methacrylate esters may be used as the solvent plastic, but they have been found to produce pulse hegihts which are not as great as scintillating compositions in which the solvent base plastic is a vinyl toluene polymer or vinyl toluene copolymer.

In a preferred embodiment of my invention, the lead compound is a mixed lead salt containing a polymerizable grouping, that is to say, when $x$ in the general formula has a value between .5 and 1.

Plastic scintillating compositions with a high percentage by weight of lead may be formed with mixed lead salts containing an acrylyl or methacrylyl radical as one of the acid moieties. Such mixed lead salts may be readily polymerized with the monomeric constituents of the solvent base plastic and a small percentage of an organic phosphor to produce a transparent product which converts the incident X- and gamma-radiation to useful light pulses. In general, more lead may be incorporated in the scintillating composition when the lead salt contains a polymerizable radical.

The following examples illustrate the method of preparing some typical constituent lead salts and the method of preparing the plastic scintillating compositions in accordance with this invention:

EXAMPLE I.—PREPARATION OF LEAD ALPHA-PHENYL BUTYRATE

Pure alpha-phenylbutyric acid, 39.4 g., was dissolved in 90 cc. of distilled water containing 9.6 g. sodium hydroxide. The solution was stirred and a solution of 45.5 g. lead acetate (Pb(OAc)$_2$.3H$_2$O) in 90 cc. distilled water was added. A white precipitate was formed which was slightly soft at first but which later became hard. The precipitate was collected, washed and dried. The product thus obtained was recrystallized from 570 cc. methanol using Norit (a finely divided powder use as decolorizing agent). The crystal crop was collected, washed with methanol, dried over sulfuric acid for 24 hours and then to constant weight in an oven maintained at 50° C. The recrystallized dried product had a melting point in the range 128.5–130° C. Before use in plastics the recrystallized product was again decolorized by dissolving it in benzene and passing the resultant solution through a column containing anhydrous alumina and silica gel. The effluent solution was concentrated to dryness by evaporation, yielding the desired product as a white powder.

EXAMPLE II.—PREPARATION OF A MIXED SALT CONTAINING A POLYMERIZABLE GROUPING

A triple lead salt containing a polymerizable (in this case, methacrylyl) radical was prepared in the following manner: Methacrylic acid was distilled to remove any polymerization inhibitor. 4.30 grams (0.050 mole) of the distilled methacrylic acid, 2.85 grams of 2-ethyl hexoic acid (0.0267 mole) and 2.73 grams of trimethylacetic acid (0.0267 mole) were weighed out and mixed together with 40 cc. of methanol; 12.20 grams (0.0546 mole) of powdered lead oxide PbO was added in portions over about 30 minutes while stirring the mixture. At the end of this time the PbO had mostly dissolved. This solution was then filtered. The clear colorless filtrate was concentrated under vacuum (30 mm. mercury) at approximately room temperature. A white crystalline precipitate formed which was collected and, while still damp, the precipitate was dissolved in 30 cc. of acetone. A lightly turbid solution resulted which was decolorized by mixing it with Norit, filtered, and again vacuum concentrated. The product was now a soft clear resin. It was dissolved in 50 cc. of benzene, again decolorized with Norit, filtered, and vacuum concentrated. When most of the solvent had been removed, the pressure was reduced to approximately 3 mm. The product, a clear soft gum, expands into a crisp, solid, transparent resin having a foamy appearance. Double lead salts containing an acrylyl or methacrylyl radical may be prepared by a similar procedure.

Care should be exercised in preparing the mixed salts to avoid formation of a product containing more than one polymerizable radical (i.e., containing more than one acrylyl or methacrylyl radical). If a mixed lead salt is produced in which there is more than one acid moiety which is polymerizable, a cross-linked polymer forms as an insoluble gel at an early stage in the polymerization. The resultant fully polymerized product is useless for the purposes of this invention since it is opaque and contains many cracks.

EXAMPLE III.—PREPARATION OF THE COPOLYMER MATRIX

There were weighed into a Pyrex tube (1" diameter x 6" and with a 4" filling stem of 12 mm. Pyrex tubing) 0.5 gram phenylbiphenyl oxadiazole-1,3,4, 0.05 gram p-bis [2-(5-phenyloxazolyl)]-benzene, and 0.0125 gram diphenyl stilbene. 37.5 cc. of vinyl toluene which had been vacuum distilled twice and 12.5 cc. of cyclohexyl methacrylate were then added. The cyclohexyl methacrylate had been purified earlier by vacuum distilling, extracting with 1% aqueous alkali, washing with water and drying with anhydrous sodium sulfate. The Pyrex tube was then attached to a vacuum pump, evacuated thoroughly to 2 mm. mercury pressure and sealed at the stem with a flame. To form a homogeneous polymer, the tube was heated to 120° C. and shaken repeatedly until all additives were dissolved. It was held at 120° C. for one day, followed by two days at 150° C. The tube was then held overnight at 75° C. The tube was broken and cooled to room temperature in a thermostatically controlled water bath. Slow and even cooling was found to be essential to avoid formation of voids, vacuum bubbles and/or internal stresses within the solid polymer. The cooled plastic was machined into cylinders of the desired size and thickness and thereafter it was finely polished.

EXAMPLE IV.—PREPARATION OF THE COMPLETE SCINTILLATING COMPOSITION

A Pyrex tube was charged with phosphors used in Example III. Five grams of the lead salt prepared in Example II were weighed into the tube 37.5 cc. of vinyl toluene and 12.5 cc. of cyclohexyl methacrylate were then added, the tube was evacuated and sealed off and the mixture polymerized as described in Eample III.

Any concentration of salts may be used, subject to their solubilities in the initial monomers and resultant polymer matrix. In the case of the lead salt used in Example II, up to 20 grams can be dissolved to yield a virtually clear plastic containing about 15% by weight lead of the total composition. As an alternate procedure to that described, the lead salt may be dissolved in vinyl toluene, or a vinyl toluene cyclohexyl methacrylate mixture, prior to adding to the polymerization tube. It may be dissolved by stirring in the cold, and preferably the solution should then be filtered before adding it to the tube. The polymerization is then completed as described.

In order to test the various plastic compositions for their scintillation efficiency, one end of the plastic cylinder under test was placed in optical contact with the window of a Dumont-6292 photomultiplier tube. A drop or two of mineral oil between the surfaces assures good optical contact. A Baird-Atomic scintillation counter was electrically connected to the photomultiplier. To measure pulse heights, the plastic scintillator-photomultiplier tube assembly was positioned in a light-tight case. A 5-microcurie cobalt-60 source, arranged to emit a narrow pencil of gamma rays, was placed 2½ inches from the scintillator. A count was made at a fixed bias setting on the counter using a standard scintillator. The standard used was a polyvinyl toluene plastic containing 3.5% terphenyl and .05% diphenyl stilbene (sold as Pilot Scintillator B by Pilot Chemicals Inc.). This standard has been found to give a variation in pulse height of ±5% based on tests conducted with a large number of samples and produces a pulse height of about 50% of that given by anthracene. The standard was then replaced by the test sample, and the bias setting adjusted until the same counting rate was obtained as that given by the standard. The ratio of the bias setting of the test sample to that of the standard is a measure of the pulse height. Table I below lists a number of lead-loaded scintillating compositions in accordance with my invention. The pulse heights are given as percentages of the standard described above. All of the scintillating compositions in Table I produced useful pulse heights and gave a counting rate several times that of the standard with a low energy source, such as $Co^{57}$.

Table I

| Monomers | Phosphors | Metal Salt | Pulse Height, Percent |
|---|---|---|---|
| 1. VT[a] | 2.5% terphenyl<br>0.1% POPOP[c]<br>0.025% DPS[d]<br>0.005% BOPOB[e] | 10% Pb-ethyl butyrate-trimethyl acetate-methacrylate. | 63 |
| 2. VT | 1% PBD[f]<br>0.1% POPOP | 10% Pb octoate-methacrylate. | 45 |
| 3. VT | 1% PBD<br>0.1% POPOP | 10% Pb alpha-phenyl butyrate. | 45 |
| 4. 25% CHM[b], 75% VT | 0.5% PBD<br>0.1% POPOP<br>0.25% DPS | 25% Pb trimethyl acetate-methacrylate. | 18 |
| 5. VT | 1% PPD[g]<br>0.5 PBD<br>0.1% POPOP<br>0.025% DPS | 9% Pb trimethyl acetate, 5% Pb phenyl butyrate. | 48 |
| 6. 50% CHM, 50% VT | 1% PBD<br>0.1% POPOP | 10% Pb ethyl butyrate-trimethyl acetate. | 35 |

[a] Vinyl toluene.
[b] Cyclohexyl methacrylate.
[c] p-Bis [2-(5-phenyloxazolyl)]-benzene.
[d] Diphenyl stilbene.
[e] p-Bis [2-(5-p-biphenylyloxazolyl)]-benzene.
[f] Phenylbiphenylyloxadiazole-1,3,4.
[g] Diphenyloxadiazole-1,3,4.

While it is desirable that the lead salt be soluble in the solvent plastic, it is not the sole criterion which can be used in selecting the heavy metal additive to be incorporated in the scintillating composition. I have found that the spectral absorption characteristics affect the pulse heights of the plastic scintillating compositions. In comparing the ultraviolet absorption sepectrum of lead ethyl butyrate with lead phenylbutyrate, a marked increase in absorption of the latter compound is noted over the former, particularly in the far ultraviolet region (200–230 millimicrons). I have found that the absorption characteristics of these salts may be correlated with the pulse heights of heavy metal loaded plastic scintillating compositions. For example, the pulse height of a scintillating composition containing .75% lead as the phenylbutyrate was found to have 74% of the pulse height of the standard whereas the pulse height of a scintillating composition containing the same amount of lead as lead ethyl butyrate was found to be 81% of the standard. Apparently those lead compounds which absorb least in the far ultraviolet tend least to reduce the light output of the plastic scintillating composition.

The spectral characteristics of the phosphors and the base plastic also affect the pulse heights of heavy metal loaded plastic scintillators. As has been previously pointed out, the major difficulty in mixing heavy metal additives with plastic scintillating compositions has been the quenching of the light produced by interaction of the incident radiation with the scintillator. I have found that this light quenching may be considerably reduced using a primary solute and base plastic whose spectral peaks (absorptive and/or emissive) lie in a different region from the absorptive peaks of the lead additives. In general, when the spectral peaks overlap the absorptive peaks of the lead compound, the light-quenching effect will be prominent and thus tend to reduce the light output.

The concept of pulse height dependency on the spectral characteristics of the lead additive and the primary solute phosphor component of the scintillating composition is illustrated by comparison of results achieved with two different compositions. In the first case, 5% (by weight) of teraphenyl lead was added to a plastic scintillator containing p-terphenyl and POPOP as the phosphors; in the second case, 5% triphenyl bismuthine was incorporated in a plastic scintillator also containing p-terphenyl and POPOP. Both plastics containing the heavy metal additives were clear and colorless. However, the lead-loaded plastic scintillator had a pulse height which was 44% of the standard, and the bismuth-loaded plastic scintillator had a pulse height of only 15% of the standard. A comparison of the ultraviolet spectra of these heavy metal compounds showed the bismuth compound to have a considerably higher absorption near the absorption peak of p-terphenyl than the lead compound. Similar improvements in pulse heights may be achieved using base plastics having spectral peaks which do not overlap or otherwise interfere with the absorption peaks of the heavy metal compound.

A singular advantage is achieved by the compositions of this invention in that a plastic scintillation system is provided which has a fast response to the incident radiation, wherein the interaction with the incident radiation occurs largely by the photoelectric effect, and yet wherein a substantial pulse height is obtained to permit ready measurement.

A particularly useful application for these lead-loaded plastic scintillators is in detection of low energy X- and gamma-radiation. To test this, a 1″ diameter by 1″ thick plastic scintillating composition containing only 4% lead as the methacrylate-isobutyrate was placed against the face of the photomultiplier tube and the scintillation counter connected to the photomultiplier. Using the 123 Kev. energy peak from a cobalt-57 source, it was found that the counting rate with the lead-loaded composition was five times that of the standard plastic scintillator referred to before. Other useful applications will readily occur to those skilled in the art.

Since many embodiments might be made in present invention and since many changes might be made in the embodiments described, it is to be understood that the foregoing description is to be interpreted as illustrative only and not in a limiting sense.

I claim:
1. A solid plastic scintillation composition consisting essentially of in solid solution at least one organic phosphor and a compound having the following general formula:

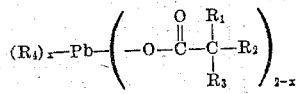

where $R_1$, $R_2$ and $R_3$ are selected from the group consisting of hydrogen, alkyl and phenyl, $R_4$ is selected from the group consisting of acrylyl and methacrylyl radicals and $x$ is a number from .5 to 1; however, when $R_1$, $R_2$ and $R_3$ are all hydrogen then $x$ is equal to 1, said phosphor and said compound being dissolved in a polymeric resin selected from the group consisting of polyvinyl toluene and copolymers of vinyl toluene and cyclohexyl methacrylate.

2. A solid plastic scintillating composition consisting essentially of a primary phosphor, wave length-shifting phosphor and a lead compound having the following general formula:

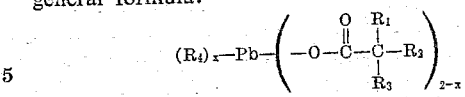

where $R_1$, $R_2$ and $R_3$ are selected from the group consisting of hydrogen, alkyl and phenyl, $R_4$ is selected from the group consisting of acryl and methacrylyl radicals and $x$ is a number from .5 to 1, however, when $R_1$, $R_2$ and $R_3$ are all hydrogen, then $x$ is equal to 1, said phosphor and said lead compound being dissolved in a polymeric resin selected from the group consisting of polyvinyl toluene and copolymers of vinyl toluene with cyclohexyl methacrylate.

References Cited in the file of this patent
UNITED STATES PATENTS

| | | |
|---|---|---|
| 2,488,550 | Morris | Nov. 22, 1949 |
| 2,596,371 | Chadwick | May 13, 1952 |
| 2,755,253 | Muehlhause | July 17, 1956 |
| 2,824,841 | Buck et al. | July 17, 1956 |
| 2,872,469 | Stevens | Feb. 3, 1959 |
| 2,937,999 | Schulman et al. | May 24, 1960 |

OTHER REFERENCES

Muehlhause: "Neutron Scintillation Counters," 5th Scintillation Counter Symposium, February 28–29 (1956), pp. 19–20.

Scintillation Counting, Nucleonics, vol. 14, No. 4, April 1956, page 48.